US011118593B2

(12) United States Patent
Lee et al.

(10) Patent No.: US 11,118,593 B2
(45) Date of Patent: Sep. 14, 2021

(54) COMPRESSOR SYSTEM AND CONTROL METHOD OF THE SAME

(71) Applicant: YUJIN MACHINERY LTD., Gyeonggi-do (KR)

(72) Inventors: Jae Young Lee, Seoul (KR); Kil Won Son, Gyeonggi-do (KR); Gi Ung Yum, Gyeonggi-do (KR)

(73) Assignee: YUJIN MACHINERY LTD., Gyeonggi-do (KR)

( * ) Notice: Subject to any disclaimer, the term of this patent is extended or adjusted under 35 U.S.C. 154(b) by 148 days.

(21) Appl. No.: 16/686,354

(22) Filed: Nov. 18, 2019

(65) Prior Publication Data

US 2021/0131442 A1 May 6, 2021

(30) Foreign Application Priority Data

Oct. 31, 2019 (KR) .................. 10-2019-0137934

(51) Int. Cl.
*F04D 27/02* (2006.01)
*F04D 27/00* (2006.01)

(52) U.S. Cl.
CPC ....... *F04D 27/0246* (2013.01); *F04D 27/004* (2013.01); *F04D 27/0215* (2013.01)

(58) Field of Classification Search
CPC ............. F04D 27/0246; F04D 27/0215; F04D 27/004; F04D 27/002; F04D 27/001
See application file for complete search history.

(56) References Cited

U.S. PATENT DOCUMENTS 5,306,116 A * 4/1994 Gunn .................. F04D 27/0207 415/27
7,210,895 B2 * 5/2007 Kotani ................ F04D 27/0246 415/1
10,260,513 B2 * 4/2019 Higashi ................. F04D 27/001
10,260,514 B2 * 4/2019 Kim ..................... F04D 27/0246
10,487,841 B2 * 11/2019 Bae ......................... F04D 25/06

FOREIGN PATENT DOCUMENTS

| JP | 10-089287 A | 4/1998 |
|---|---|---|
| KR | 10-0502299 B1 | 7/2005 |
| KR | 10-2016-0003759 A | 1/2016 |

OTHER PUBLICATIONS

Office action dated Sep. 18, 2020 from Korean Patent Office in a counterpart Korean Patent Application No. 10-2019-0137934 (all the cited references are listed in this IDS.) (English translation is also submitted herewith.).

* cited by examiner

*Primary Examiner* — Richard A Edgar
*Assistant Examiner* — Jackson N Gillenwaters
(74) *Attorney, Agent, or Firm* — The PL Law Group, PLLC

(57) ABSTRACT

A compressor system includes an inlet in which fluid flows, an inlet temperature measuring part configured to measure an inlet temperature (T_in) of the fluid at the inlet, an inlet guide vane (IGV) configured to change opening degree (IGV_position) to control a flow rate of the fluid through the inlet, a compressor to compress the fluid passing through the inlet guide vane, a motor connected to the compressor to drive the compressor, and configured to change rotating speed, a discharge pressure measuring part to measure a discharge pressure (P_disch) of the fluid passed the compressor, an outlet to discharge the compressed fluid, and a check valve installed at the outlet to prevent backflow of the fluid.

8 Claims, 4 Drawing Sheets

COMPRESSOR SYSTEM AND CONTROL METHOD OF THE SAME

CROSS-REFERENCE TO RELATED APPLICATIONS

This application claims priority to Korean Patent Application No. 10-2019-0137934, filed on Oct. 31, 2019, and all the benefits accruing therefrom under 35 U.S.C. § 119, the content of which in its entirety is herein incorporated by reference.

BACKGROUND

1. Technical Field

Exemplary embodiments of the inventive concept relate to a compressor system and a control method of the compressor system. More particularly, exemplary embodiments of the inventive concept relate to a compressor system capable of improving driving efficiency and a control method of the compressor system.

2. Description of the Related Art

Compressor systems are used in a variety of industries. For example, a general industrial turbo air compressor using a capacity control method by an inlet guide vane or a capacity control method by a variable speed motor is widely used.

In the case of the compressor system of the capacity control method using the inlet guide vane, a fluid having a desired pressure may be obtained by controlling a flow rate of incoming fluid. In a pre-swirl section, there is an advantage that efficiency is relatively higher than other methods, but it has a mechanically complicated structure, and an operating efficiency is low because it operates in a section lower than a design temperature.

In the case of the compressor system of the variable speed motor, a fluid having a desired pressure may be obtained by controlling RPM (revolution per minute) of the motor connected to the compressor. It has a relatively simple structure and can be manufactured in a relatively small size by selecting a low design temperature. However, system efficiency is low and a size and capacity of an inverter to change the motor speed is not suitable for large compressors. It must be operated at a certain rotational speed to avoid the critical speed caused by resonance.

Along with this, recently, as energy saving and efficiency become a social issue, need to develop industrial turbo air compressors with improved efficiency of major components and control logic for smart operation and improved efficiency of the compressor system.

Prior art (Patent Document 1) Republic of Korea Patent Publication No. 10-502299 (2005 Jul. 11 registration)

SUMMARY

One or more exemplary embodiment of the inventive concept provides a compressor system capable of improving power efficiency based on relatively simple control logic.

One or more exemplary embodiments of the inventive concept also provide a control method of the compressor system.

According to an exemplary embodiment of the inventive concept, a compressor system includes an inlet in which fluid flows, an inlet temperature measuring part configured to measure an inlet temperature (T_in) of the fluid at the inlet, an inlet guide vane (IGV) configured to change opening degree (IGV_position) to control a flow rate of the fluid through the inlet, a compressor to compress the fluid passing through the inlet guide vane, a motor connected to the compressor to drive the compressor, and configured to change rotating speed, a discharge pressure measuring part to measure a discharge pressure (P_disch) of the fluid passed the compressor, an outlet to discharge the compressed fluid, and a check valve installed at the outlet to prevent backflow of the fluid.

In an exemplary embodiment, when the inlet temperature (T_in) measured by the inlet temperature measuring part is higher than a predetermined temperature (T_set), RPM (revolution per minute) of the motor may be set to be increased.

In an exemplary embodiment, increasing the RPM of the motor may be performed by the following equation.

$$(N\_new)=[(T\_innew)/(T\_inold)]^{1/2} \times (N\_old) \qquad <\text{Equation}>$$

(Here, N_new is a newly set RPM, N_old is a predetermined RPM or initially a designed RPM, T_innew is a newly measured inlet temperature, T_inold is a previously measured inlet temperature or initially a design temperature)

In an exemplary embodiment, the design temperature may be about 10 to 15 degrees Celsius.

In an exemplary embodiment, an opening degree (IGV_position) of the inlet guide vane may be controlled according to the discharge pressure (P_disch) measured in the discharge pressure measuring part.

In an exemplary embodiment, when the discharge pressure (P_disch) is higher than a predetermined upper limit pressure (P_upper), the opening degree (IGV_position) of the inlet guide vane may be set to be lowered. When the discharge pressure (P_disch) is lower than a predetermined lower limit pressure (P_lower), the opening degree (IGV_position) of the inlet guide vane may be set to be increased.

In an exemplary embodiment, the predetermined temperature (T_set) may be about 10 to 15 degrees Celsius as a design temperature of the compressor.

In an exemplary embodiment, the compressor system may further include a blow off valve disposed between the outlet and the compressor. When the opening degree (IGV_position) of the inlet guide vane is lower than a predetermined lower limit position (IGV_min), the blow off valve may be set to be opened and RPM of the motor is set to a predetermined minimum PRM.

In an exemplary embodiment, the lower limit position (IGV_min) of the inlet guide vane may be determined by applying an offset to a surge occurrence value.

In an exemplary embodiment, the compressor system may further include a load control valve installed at the outlet to adjust the flow rate of the fluid discharged.

According to an exemplary embodiment of the inventive concept, control method of a compressor system is performed by the compressor system which includes an inlet in which fluid flows, an inlet temperature measuring part configured to measure an inlet temperature (T_in) of the fluid at the inlet, an inlet guide vane (IGV); a compressor to compress the fluid passing through the inlet guide vane, a motor to drive the compressor, a discharge pressure measuring part to measure a discharge pressure (P_disch) of the fluid passed the compressor, an outlet to discharge the compressed fluid; and a check valve installed at the outlet to prevent backflow of the fluid. The control method includes reading an opening degree (IGV_position) of the inlet guide vane, measuring the inlet temperature (T_in), and measuring the discharge pressure (P_disch), adjusting RPM (revolution per minute) of the motor according to the inlet temperature (T_in), comparing the discharge pressure (P_disch) with a predetermined upper limit pressure (P_upper) and a lower limit pressure (P_lower), and adjusting the opening degree (IGV_position) of the inlet guide vane according to a result of the comparing step.

In an exemplary embodiment, in adjusting RPM of the motor, when the inlet temperature (T_in) is higher than a predetermined temperature (T_set), the RPM of the motor may be adjusted using the following equation.

$$(N\_new)=[(T\_innew)/(T\_inold)]^{1/2} \times (N\_old) \quad <\text{Equation}>$$

(Here, N_new is a newly set RPM, N_old is a predetermined RPM or initially a designed RPM, T_innew is a newly measured inlet temperature, T_inold is a previously measured inlet temperature or initially a design temperature) In an exemplary embodiment, the predetermined temperature (T_set) may be about 10 to 15 degrees Celsius as a design temperature of the compressor.

In an exemplary embodiment, in comparing the discharge pressure (P_disch), when the discharge pressure (P_disch) is higher than a predetermined upper limit pressure (P_upper), the opening degree (IGV_position) of the inlet guide vane may be set to be lowered in adjusting the opening degree (IGV_position).

In an exemplary embodiment, the compressor system may further include a blow off valve disposed between the outlet and the compressor. In comparing the discharge pressure (P_disch), when the discharge pressure (P_disch) is higher than a predetermined upper limit pressure (P_upper), the control method may further include reading again the opening degree (IGV_position) of the inlet guide vane and measuring again the discharge pressure (P_disch) after adjusting the opening degree (IGV_position). When the opening degree (IGV_position) of the inlet guide vane which is read again is lower than a predetermined lower limit position (IGV_min), the blow off valve may be set to be opened and RPM of the motor is set to a predetermined minimum PRM.

In an exemplary embodiment, the lower limit position (IGV_min) of the inlet guide vane may be determined by applying an offset to a surge occurrence value.

In an exemplary embodiment, in comparing the discharge pressure (P_disch), when is lower than a predetermined lower limit pressure (P_lower), the opening degree (IGV_position) of the inlet guide vane may be set to be increased in adjusting the opening degree (IGV_position).

In an exemplary embodiment, the compressor system may further include a load control valve installed at the outlet to adjust the flow rate of the fluid discharged. The control method may further include opening the load control valve before reading and measuring step.

According to the exemplary embodiments of the present inventive concept, a compressor control system according to the present embodiment includes an inlet temperature measuring part configured to measure an inlet temperature of fluid, an inlet guide vane configured to change opening degree to control a flow rate of the fluid through the inlet, a compressor to compress the fluid passing through the inlet guide vane, a motor connected to the compressor to drive the compressor, and configured to change rotating speed and a discharge pressure measuring part to measure a discharge pressure of the fluid passed the compressor. Therefore, it is possible to measure only the inlet temperature and the outlet pressure without using an expensive flow meter and the like, and improve operation efficiency by using only relatively simple logic.

In particular, by adjusting RPM (revolution per minute) of the motor in accordance with the inlet temperature, and corresponding to by adjusting the opening degree of the inlet guide vane according to the discharge pressure, it is possible to minimize power consumption in a load state or in an operating region, not the no-load state. In addition, in an unload state, an energy saving effect may be obtained by lowering the RPM to a minimum value.

In addition, since the design temperature of the compressor is lowered by about 10 to 15 degrees Celsius, it is possible to reduce the compressor size than a general inlet guide vane compressor system designed based on 35 degrees Celsius.

It is to be understood that both the foregoing general description and the following detailed description are exemplary and explanatory and are intended to provide further explanation of the invention as claimed.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION

Hereinafter, the inventive concept will be explained in detail with reference to the accompanying drawings.

Figure 1:
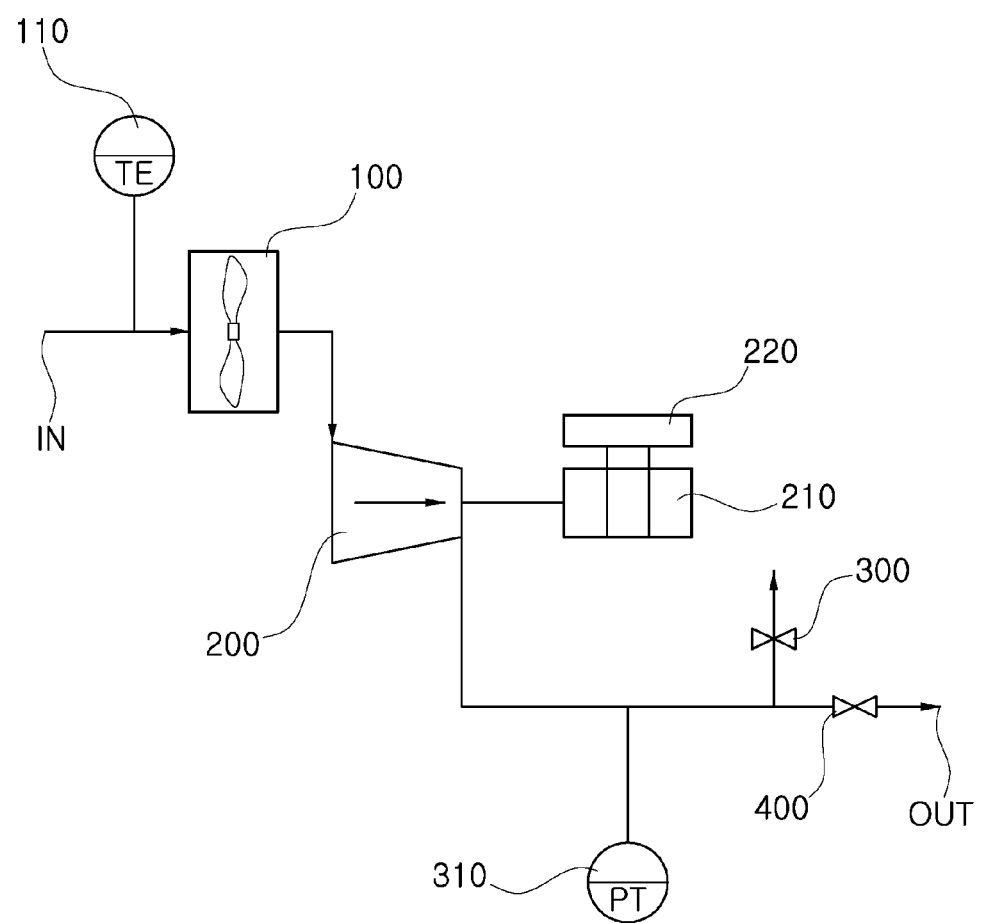
FIG. 1 is a conceptual diagram illustrating a compressor system according to an exemplary embodiment of the inventive concept.

FIG. 1 is a conceptual diagram illustrating a compressor system according to an exemplary embodiment of the inventive concept.

Referring to FIG. 1, the compressor system may include an inlet IN, an inlet temperature measuring part 110, an inlet guide vane (IGV; 100), a compressor 200, a motor 210, an inverter 220, a discharge pressure measuring part 310, a blow off valve 300, a check valve 400, and an outlet OUT. In addition, the compressor system may further include a flow path (pipe) connecting the components. The flow of fluid is shown by the arrow in the figure.

Fluid may flow into the compressor system through the inlet IN. The fluid may be outside air.

The inlet temperature measuring part 110 may measure an inlet temperature (T_in) of the fluid at the inlet IN. The inlet temperature measuring part 110 may be a thermometer capable of measuring the temperature of the fluid.

The inlet guide vane 100 may be installed at an inlet of the compressor 200, and control a flow rate of the fluid flowing into the compressor 200. For example, the inlet guide vane 100 may be provided to change an opening degree in order to control the flow rate of the fluid passing through the inlet IN. The inlet guide vane 100 generally varies an inlet area of the compressor 200 while varying the rotation angle according to an operation of an actuator. Various structures of inlet guide vane is well known, the detailed structure and operation mechanism will be omitted for convenience.

The compressor 200 may compress the fluid passing through the inlet guide vane 100 to obtain a high pressure fluid. The compressor 200 may be a centrifugal compressor that compresses the fluid by using a centrifugal force by a high speed rotating impeller. That is, the compressor 200 may include an impeller rotating by the motor 210, and the fluid flowing into the inlet of the compressor 200 may be compressed by the rotation of the impeller and flow out through an outlet of the compressor 200.

The motor 210 may be connected to the compressor 200 to provide power for compressing the fluid. The motor 210 may be connected to the compressor 200 to drive the compressor 200 and to change a rotation speed (RPM). For example, the motor 210 may use an AC motor, and the inverter 220 may be connected to change the rotation speed.

The inverter 220 may include a circuit for changing the rotation speed of the motor 210 by changing a frequency, through which, it is possible to change the rotational speed of the motor 210. In some embodiments, the motor 210 may change the rotation speed according to a current control such as PWM using a DC motor.

The discharge pressure measuring part 310 may measure a discharge pressure (P_disch) of the fluid passed through the compressor 200. The discharge pressure measuring part 310 may be a pressure gauge for measuring the fluid pressure of the pipe through which the fluid flows.

The blow off valve 300 may be disposed between the outlet OUT and the compressor 200. The blow off valve 300 may be installed between the outlet and the compressor in preparation for an occurrence of a surge phenomenon during an abnormal operation in which the compressor system is out of an operation region.

The check valve 400 may be installed in front of the outlet OUT. The check valve 400 is a valve that allows the fluid to flow in only one direction to prevent a back flow of the fluid. It is possible to prevent the fluid passing through the compressor 200 flows back to the compressor 200 again.

In addition, a load control valve (not shown) may be further installed together with the check valve 400. The load control valve may control the flow of the compressed fluid discharged through the outlet OUT. That is, the load control valve may adjust the flow rate of the fluid discharged from the outlet OUT. By opening and closing the load control valve, a load state and an unload state can be selected.

The fluid compressed may be discharged through the outlet OUT. The outlet OUT may be installed at a rear end of the compressor 200, and a load may be connected to the outlet OUT. For example, the compressor system may be used to provide fuel gas, such as boilers, gas turbines, and the like.

In addition, the compressor system may further include a controller (not shown) for controlling driving of the motor 210, the inlet guide vane 100 and the like. The controller may control the pressure and the flow rate at the outlet OUT according to the measured inlet temperature (T_in), the discharge pressure (P_disch) measured, the opening degree (IGV_position) of the inlet guide vane 100, the rotational speed of the motor 210.

Specifically, when the inlet temperature (T_in) is higher than the predetermined temperature (T_set), it can be controlled to increase RPM of the motor 210. At this time, the increase in the RPM of the motor 210 may use the following equation.

$$(N\_new) = [(T\_innew)/(T\_inold)]^{1/2} \times (N\_old) \quad \text{[Equation 1]}$$

(Here, N_new is a newly set RPM, N_old is a predetermined RPM or initially a designed RPM, T_innew is a newly measured inlet temperature, T_inold is a previously measured inlet temperature or initially a design temperature)

The equation 1 may be a result for controlling the RPM according to temperature to have a constant Mu (Machine Mach number) value as follows.

$$Mu = \frac{U_2}{\sqrt{kRT_1}} \quad \text{[Equation 2]}$$

(Here, $U_2$ is an exit linear velocity of a design impeller, k is the gas constant, and Ti is a design temperature)

$$(M_u)_{op} = (M_u)_{des} \quad \text{[Equation 3]}$$

(Here, $(M_u)_{op}$ is the $M_u$ value of an operating state, $(M_u)_{des}$ is the design $M_u$ value of the compressor)

$$\left(\frac{U_2}{a}\right)_{op} = \left(\frac{U_2}{a}\right)_{des} \quad \text{[Equation 4]}$$

(Here, $U_2$ is an outlet linear velocity of the impeller, a is the inlet sound velocity, op is the operating state, and des is the design value)

$$(U_2)_{op} = \frac{a_{op}}{a_{des}}(U_2)_{des} \quad \text{[Equation 5]}$$

$$N_{op} = \frac{a_{op}}{a_{des}} N_{des} = \sqrt{\frac{T_{op}}{T_{des}}} N_{des} \quad \text{[Equation 6]}$$

($N_{op}$ is the operating RPM (i.e. calculated RPM), $N_{des}$ is the design RPM, Top is the operating temperature and $T_{des}$ is the design temperature)

In this case, the predetermined temperature (T_set) may be 10 to 15 degrees Celsius as the design temperature of the compressor.

The controller may control the opening degree (IGV_position) of the inlet guide vane 100 according to the discharge pressure P_disch measured by the discharge pressure measuring part 310. For example, when the discharge pressure P_disch is higher than a predetermined upper limit pressure P_upper, the opening degree IGV_position of the inlet guide vane may be lowered. When the discharge pressure P_disch is lower than a predetermined lower limit pressure P_lower, the opening degree (IGV_position) of the inlet guide vane may be increased. (See FIG. 3).

In addition, when the opening degree (IGV_position) of the inlet guide vane 100 is lower than a predetermined lower limit position (IGV_min), the load control valve (or check valve) may be closed, and the blow off valve 300 may be opened. Therefore, it can be switched to no-load state to prevent the occurrence of surge.

In the case of a compressor using a general inlet guide vane, a design of the impeller of the compressor based on a temperature, if an operating temperature is higher than the design temperature, it cannot meet a required capacity. Thus, the design temperature of the compressor is about 35 degrees Celsius which is relatively high.

On the other hand, considering that an average temperature of year is 12 degrees Celsius, most compressor operation is lower than the design temperature, which is mostly operating in some closed state, not 100% open inlet guide vane. That is, since the compressor system is operated narrower than an actual available operating area, an overall power efficiency is lowered accordingly. (See FIG. 4)

In addition, in the case of a compressor using a general inlet guide vane, a surge margin is largely set in consideration of a change in performance due to a change in inlet temperature and a design temperature higher than an average temperature. Therefore, operation efficiency of the compressor using the general inlet guide vane is relatively low.

On the other hand, the compressor control system according to the present embodiment includes an inlet temperature measuring part configured to measure an inlet temperature of fluid, an inlet guide vane configured to change opening degree to control a flow rate of the fluid through the inlet, a compressor to compress the fluid passing through the inlet guide vane, a motor connected to the compressor to drive the compressor, and configured to change rotating speed and a discharge pressure measuring part to measure a discharge pressure (P_disch) of the fluid passed the compressor. Therefore, it is possible to measure only the inlet temperature and the outlet pressure without using an expensive flow meter and the like, and improve operation efficiency by using only relatively simple logic.

In particular, by adjusting RPM of the motor in accordance with the inlet temperature, and corresponding to by adjusting the opening degree of the inlet guide vane according to the discharge pressure, it is possible to minimize power consumption in a load state or in an operating region, not the no-load state. In addition, in an unload state, an energy saving effect may be obtained by lowering the RPM to a minimum value.

In addition, since the design temperature of the compressor is lowered by about 10 to 15 degrees Celsius, it is possible to reduce the compressor size than a general inlet guide vane compressor system designed based on 35 degrees Celsius.

Figure 2:
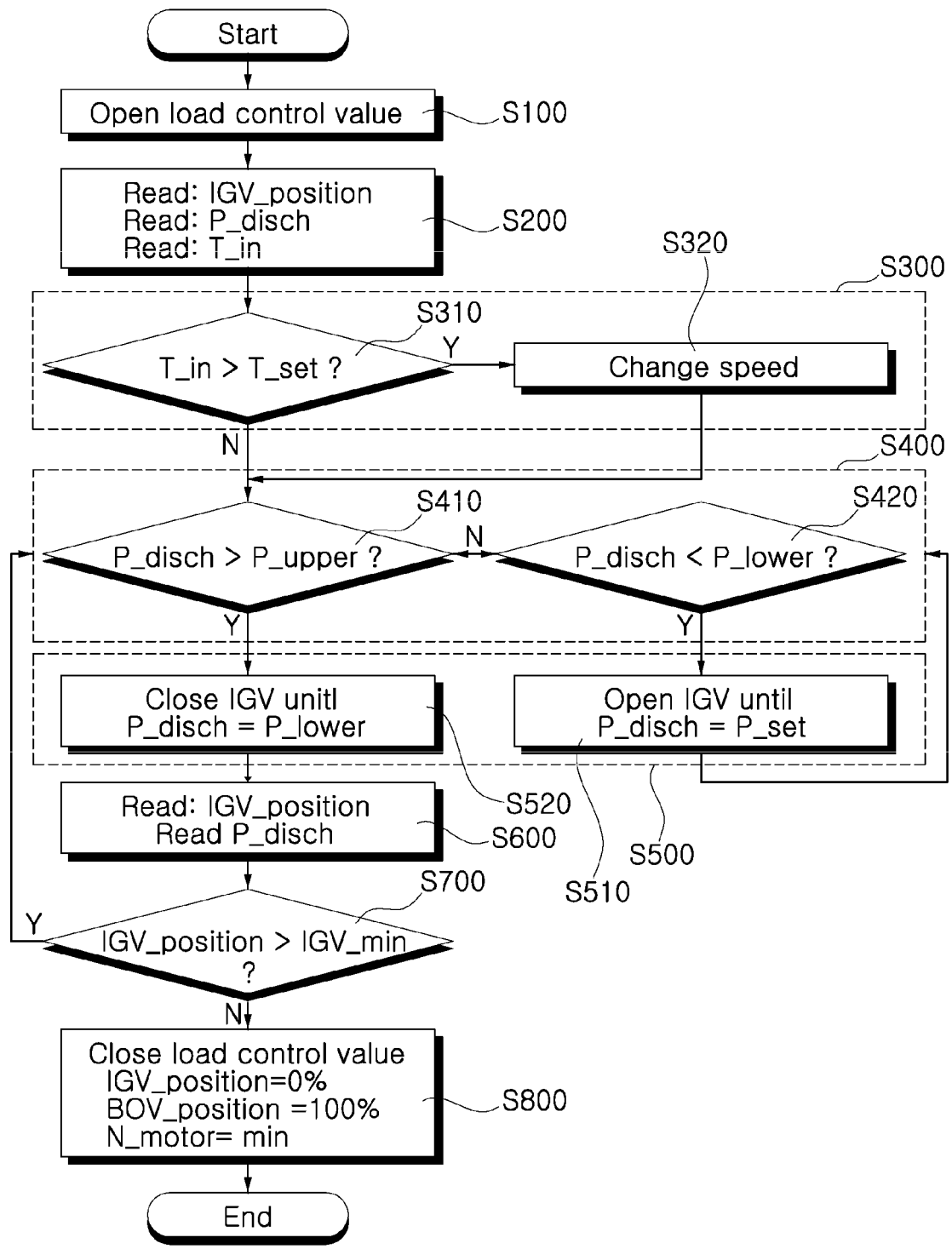
FIG. 2 is a flow chart illustrating a control method of a compressor system according to an exemplary embodiment of the inventive concept.

FIG. 2 is a flow chart illustrating a control method of a compressor system according to an exemplary embodiment of the inventive concept.

Referring to FIG. 2, the control method of a compressor system may be performed by a compressor system which includes an inlet in which fluid flows, an inlet temperature measuring part configured to measure an inlet temperature (T_in) of the fluid at the inlet, an inlet guide vane; a compressor to compress the fluid passing through the inlet guide vane, a motor to drive the compressor, a discharge pressure measuring part to measure a discharge pressure (P_disch) of the fluid passed the compressor, an outlet to discharge the compressed fluid; a check valve installed at the outlet to prevent backflow of the fluid, and a load control valve to adjust the flow rate of the fluid discharged. The compressor system may further include a blow off valve disposed between the outlet and the compressor.

The control method of a compressor system may include load control value opening step (S100), initial value step (S200), RPM controlling step according to inlet temperature (S300), discharge pressure measuring step (S400), inlet guide vane controlling step (S500), rereading step (S600), opening degree of inlet guide vane checking step (S700), and unload state step (S800).

In the load control value opening step (S100), the load control valve may be opened to switch the compressor system to a load state.

In the initial value step (S200), an opening degree (IGV_position) of the inlet guide vane may be read, and the inlet temperature (T_in) may be measured using the inlet temperature measuring part.

In the discharge pressure measuring step (S400), a discharge pressure (P_disch) may be measured using the discharge pressure measuring part.

The RPM controlling step according to inlet temperature (S300) may include inlet temperature comparing step (S310) and RPM controlling step (S320).

In the inlet temperature comparing step (S310), the inlet temperature (T_in) and a predetermined temperature (T_set) is compared. When the inlet temperature (T_in) is higher than the predetermined temperature (T_set), the RPM of the motor is adjusted using the above equation 1. Here, the predetermined temperature (T_set) may be about 10 to 15 degrees Celsius as a design temperature of the compressor.

The discharge pressure measuring step (S400) may include a step for comparing the discharge pressure (P_disch) and the predetermined upper limit pressure (P_upper) (S410) and a step for comparing the discharge pressure (P_disch) and a predetermined lower limit pressure (P_lower) (S420).

In the inlet guide vane controlling step (S500), the opening degree (IGV_position) of the inlet guide vane may be adjusted according to the comparison result of the step S410. When the discharge pressure (P_disch) is higher than a predetermined upper limit pressure (P_upper), the opening degree (IGV_position) of the inlet guide vane is set to be lowered in adjusting the opening degree (IGV_position) (S510).

When the discharge pressure (P_disch) is lower than a predetermined lower limit pressure (P_lower), the opening degree (IGV_position) of the inlet guide vane is set to be increased until a design pressure (P_set) (S520).

When the opening degree (IGV_position) of the inlet guide vane is lowered, the rereading step (S600), the opening degree of inlet guide vane checking step (S700), and the unload state step (S800) can be performed in order to further prevent the occurrence of surge.

In the rereading step (S600), the opening degree (IGV_position) of the inlet guide vane may be read again and the discharge pressure (P_disch) may be measured again.

In the opening degree of inlet guide vane checking step (S700), the readout opening degree (IGV_position) of the inlet guide vane may be compared with a predetermined lower limit position (IGV_min). When the opening degree (IGV_position) of the inlet guide vane which is read again is lower than the predetermined lower limit position (IGV_min), the blow off valve is set to be opened and RPM of the motor is set to a predetermined minimum PRM. (S800)

In addition, the lower limit position (IGV_min) of the inlet guide vane may be determined by applying an offset to a surge occurrence value.

Figure 3:
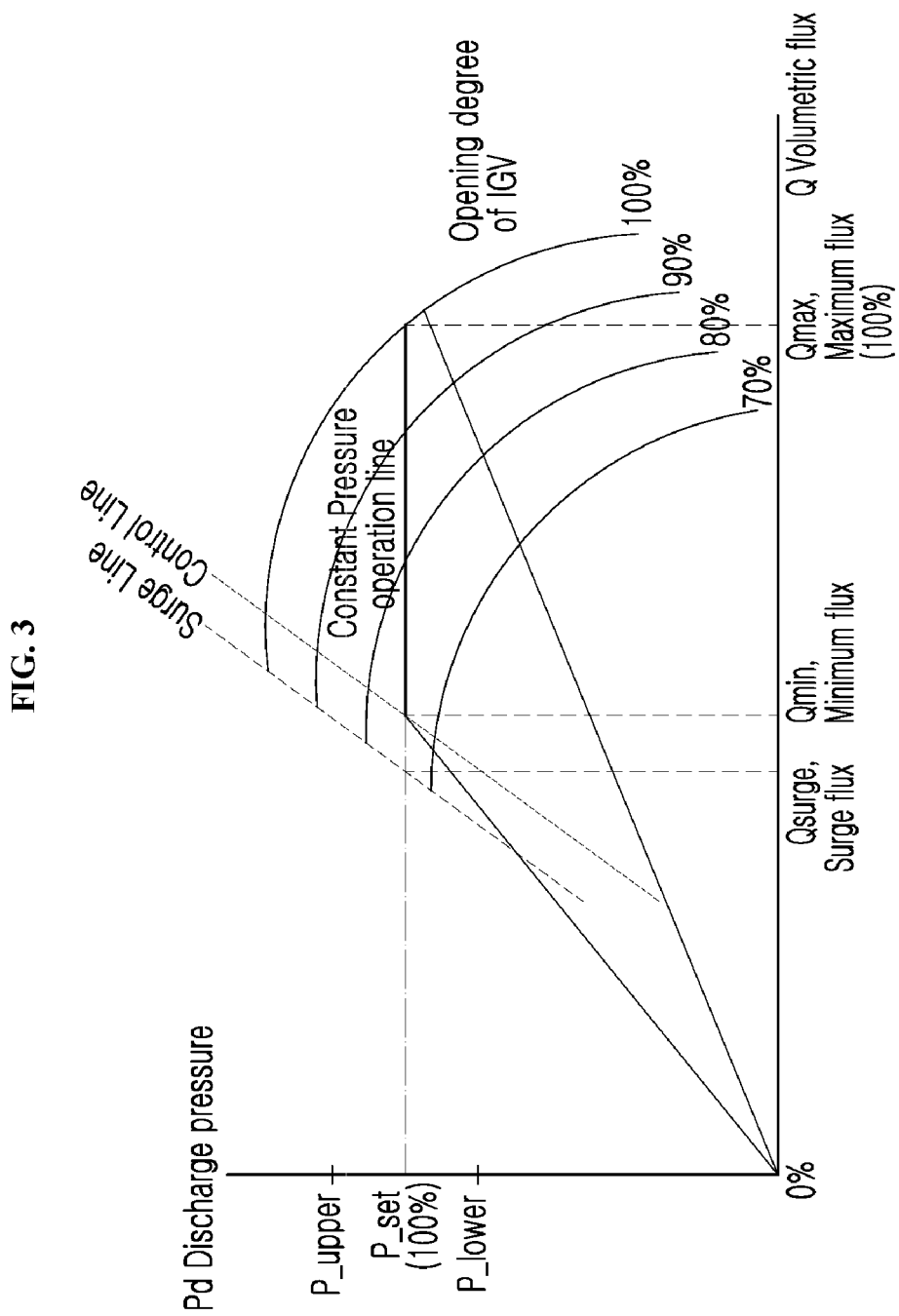
FIG. 3 is a graph showing a control range of a compressor system according to an exemplary embodiment of the inventive concept.

FIG. 3 is a graph showing a control range of a compressor system according to an exemplary embodiment of the inventive concept.

Referring to FIG. 3, an x-axis represents discharge flow rate (Q volume flow rate) of the fluid, and a y-axis represents the discharge pressure (Pd discharge pressure) of the fluid. The solid lines of the plurality of curves represent changes of the performance curve according to the opening degree of the inlet guide vane (70% to 100% is shown).

Two line segments passing through the origin represents a resistance curve according to load of the compressor system (the lower slope is full load, the higher slope is unload). The intersection of the performance curve and the system resistance curve represents the operation point.

The compressor control system is ideally operated so that the flow rate fluctuates along P_set (design pressure). As the inlet temperature is increased then the density is lowered, and the flow rate is reduced, so that the motor speed may be set to be decreased, and the opening degree of the inlet guide vane can be adjusted according to the discharge pressure. On the other hand, when the discharge pressure is increased or the discharge flow rate is lowered out of the surge line, a control line may be set in consideration of an offset value to prevent a surge. In addition, as the opening degree of the inlet guide vane decreases, the minimum opening degree may be determined by reflecting a predetermined offset value at a point outside the surge line.

Increasing the discharge pressure of the compressor system results in flow instability which leads to a surge. A cycle in which a back flow occurs in the flow when the surge occurs, a normal flow occurs when the surge is released, and the surge occurs again can be repeated in a short time. In this case, it is important to prevent the surge because the cycle can cause a severe vibration and a damage to the bearing or a rubbing of the impeller which cause the equipment may be damaged. Thus, it is important to avoid the surge.

According to the embodiments of the present invention described above, by adjusting the motor speed in accordance with the inlet temperature, and corresponding to by adjusting the opening of the inlet guide vane according to the discharge pressure, while minimizing power consumption, wide operation area can be secured.

Figure 4:
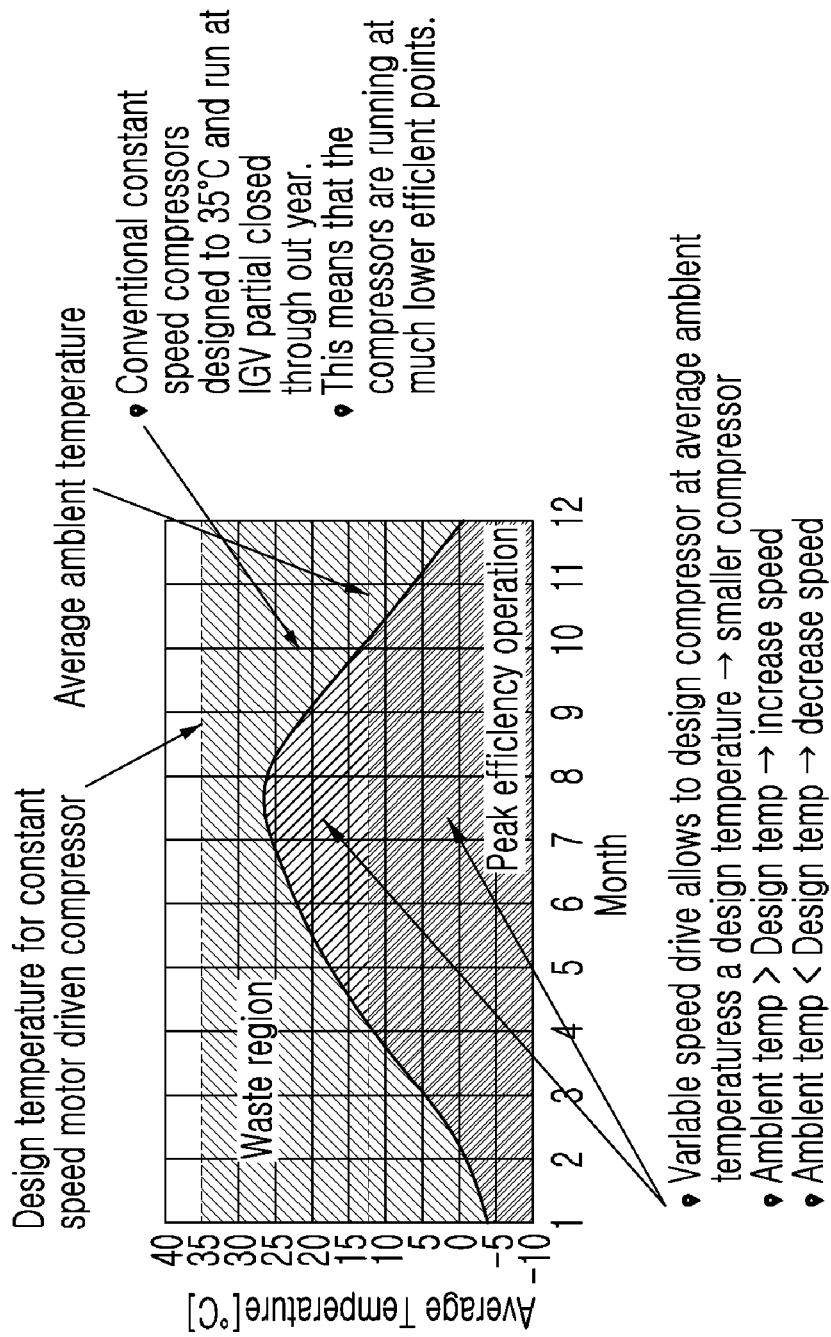
FIG. 4 is a graph for explaining the monthly average temperature and the efficiency of the compressor system.

FIG. 4 is a graph for explaining the monthly average temperature and the efficiency of the compressor system.

Referring to FIG. 4, an x-axis represents the month (Month), a y-axis represents the average temperature (Celsius). In general, compressor systems designed based on 35 degrees Celsius, most of operation is less than 35 degrees Celsius, so that efficiency is lower (waste region). According to the embodiments of the present invention described above, since the design temperature is about 10 to 15 degrees Celsius, it can be seen that on average, high efficiency can be achieved (peak deficiency operation).

The present invention is a compressor system and a control method thereof may be applied to an engine, a boiler, a gas turbine, and the like using a compressor.

The present invention can be applied to organic light emitting display devices and various electronic devices including the same. For example, the present invention can be applied to a mobile phone, a smart phone, a video phone, a smart pad, a smart watch, a tablet PC, a car navigation system, a television, a computer monitor, a notebook, and the like.

The foregoing is illustrative of the inventive concept and is not to be construed as limiting thereof. Although a few exemplary embodiments of the inventive concept have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A control method of a compressor system comprising an inlet in which fluid flows, an inlet temperature measuring part configured to measure an inlet temperature (T_in) of the fluid at the inlet, an inlet guide vane (IGV), a compressor to compress the fluid passing through the inlet guide vane, a motor to drive the compressor, a discharge pressure measuring part to measure a discharge pressure (P_disch) of the fluid passed the compressor, an outlet to discharge the compressed fluid, and a check valve installed at the outlet to prevent backflow of the fluid, the control method comprising:

reading an opening degree (IGV_position) of the inlet guide vane, measuring the inlet temperature (T_in), and measuring the discharge pressure (P_disch);

adjusting revolution per minute (RPM) of the motor according to the inlet temperature (T_in);

comparing the discharge pressure (P_disch) with a predetermined upper limit pressure (P_upper) and a lower limit pressure (P_lower); and adjusting the opening degree (IGV_position) of the inlet guide vane according to a result of the comparing step.

2. The control method of claim 1, wherein, in adjusting the RPM of the motor, when the inlet temperature (T_in) is higher than a predetermined temperature (T_set), the RPM of the motor is adjusted using the following equation:

$$(N\_new) = [(T\_innew)/(T\_inold)]^{1/2} \times (N\_old)$$

where N_new is a newly set RPM, N_old is a predetermined RPM or initially a designed RPM, T_innew is a newly measured inlet temperature, and T_inold is a previously measured inlet temperature or initially a design temperature.

3. The control method of claim 2, wherein the predetermined temperature (T_set) is about 10 to 15 degrees Celsius as a design temperature of the compressor.

4. The control method of claim 1, wherein, in comparing the discharge pressure (P_disch), when the discharge pressure (P_disch) is higher than a predetermined upper limit pressure (P_upper), the opening degree (IGV_position) of the inlet guide vane is set to be lowered in adjusting the opening degree (IGV_position).

5. The control method of claim 1, wherein the compressor system further comprises a blow off valve disposed between the outlet and the compressor, wherein in comparing the discharge pressure (P_disch), when the discharge pressure (P_disch) is higher than a predetermined upper limit pressure (P_upper), the control method further comprises reading again the opening degree (IGV_position) of the inlet guide vane and measuring again the discharge pressure (P_disch) after adjusting the opening degree (IGV_position); and when the opening degree (IGV_position) of the inlet guide vane which is read again is lower than a predetermined lower limit position (IGV_min), the blow off valve is set to be opened and RPM of the motor is set to a predetermined minimum RPM.

6. The control method of claim 5, wherein the lower limit position (IGV_min) of the inlet guide vane is determined by applying an offset to a surge occurrence value.

7. The control method of claim 1, wherein, in comparing the discharge pressure (P_disch), when the discharge pressure (P_disch) is lower than a predetermined lower limit pressure (P_lower), the opening degree (IGV_position) of the inlet guide vane is set to be increased in adjusting the opening degree (IGV_position).

8. The control method of claim 1, wherein the compressor system further comprises a load control valve installed at the outlet to adjust the flow rate of the fluid discharged; and the control method further includes opening the load control valve before reading and measuring step.

* * * * *